(12) United States Patent
Kang et al.

(10) Patent No.: US 10,063,023 B2
(45) Date of Patent: Aug. 28, 2018

(54) PDA TERMINAL AND OPERATION CONTROL METHOD THEREFOR

(71) Applicant: POINTMOBILE CO., LTD., Seoul (KR)

(72) Inventors: Jin Pill Kang, Suwon-si (KR); Hyeong Su Bae, Seoul (KR)

(73) Assignee: POINTMOBILE CO., LTD., Seoul (KR)

( * ) Notice: Subject to any disclaimer, the term of this patent is extended or adjusted under 35 U.S.C. 154(b) by 0 days.

(21) Appl. No.: 15/614,025

(22) Filed: Jun. 5, 2017

(65) Prior Publication Data

US 2017/0271829 A1    Sep. 21, 2017

Related U.S. Application Data

(63) Continuation of application No. PCT/KR2015/013380, filed on Dec. 8, 2015.

(30) Foreign Application Priority Data

Dec. 8, 2014 (KR) .................. 10-2014-0174732
Jan. 12, 2015 (KR) .................. 10-2015-0004109

(51) Int. Cl.
*H01R 29/00* (2006.01)
*H01R 33/90* (2006.01)
*G06F 13/10* (2006.01)

(52) U.S. Cl.
CPC ........... *H01R 29/00* (2013.01); *G06F 13/102* (2013.01); *H01R 33/90* (2013.01)

(58) Field of Classification Search
None
See application file for complete search history.

(56) References Cited

U.S. PATENT DOCUMENTS

2003/0222150 A1* 12/2003 Sato .............. G06F 1/1626
                                              235/472.02
2008/0128499 A1*  6/2008 Chen ............. G06K 7/10851
                                              235/444

(Continued)

FOREIGN PATENT DOCUMENTS

JP      07-311812 A     11/1995
JP    2008-129969 A      6/2008

(Continued)

OTHER PUBLICATIONS

Point Mobile Co., Ltd., "PM260 User Manual", May 15, 2013, Retrived from the Internet: <URL: http://www.pointmobile.co.kr/item.php?it_id=1380039463&ca_id=102040>.

*Primary Examiner* — Kristy A Haupt
(74) *Attorney, Agent, or Firm* — Novick, Kim & Lee, PLLC; Sang Ho Lee

(57) ABSTRACT

A PDA terminal is provided. The PDA terminal includes: a main body; a processor disposed in the main body; a memory accessible by the processor; and a display unit disposed on a front surface of the main body to display information processed by the processor. A rear cover detachable from the main body is disposed on a rear surface of the main body. After the rear cover is removed, a gun handle is usable in a state of being connected to a coupling part formed under the rear cover. Since the gun handle with a switch is usable in a state of being connected to the main body of the PDA terminal, the operation of the PDA operation can be more conveniently used in an industrial site or the like.

11 Claims, 12 Drawing Sheets

(56) References Cited

U.S. PATENT DOCUMENTS

| | | | |
|---|---|---|---|
| 2010/0018006 A1* | 1/2010 | Mangaroo | G06K 7/10881 16/422 |
| 2010/0019044 A1* | 1/2010 | Mangaroo | G06K 7/10881 235/462.47 |
| 2010/0025286 A1* | 2/2010 | Mangaroo | G06F 1/1626 206/701 |
| 2010/0258631 A1* | 10/2010 | Rueblinger | G06K 7/10881 235/462.48 |

FOREIGN PATENT DOCUMENTS

| | | |
|---|---|---|
| KR | 20-2000-0002302 U | 2/2000 |
| KR | 10-0810733 B1 | 3/2008 |
| KR | 10-2009-0020837 A | 2/2009 |
| KR | 10-2014-0128212 A | 11/2014 |

* cited by examiner

PDA TERMINAL AND OPERATION CONTROL METHOD THEREFOR

CROSS-REFERENCE TO RELATED APPLICATIONS

The present application is a continuation of International Application No. PCT/KR2015/013380, filed on Dec. 8, 2015, which claims priority from Korean Patent Application Nos. 10-2014-0174732 and 10-2015-0004109, filed on Dec. 8, 2014 and Jan. 12, 2015, respectively, each of which is hereby incorporated by reference in its entirety.

BACKGROUND

Field

The present invention relates to a PDA terminal and an operation control method therefor, and more particularly, to a PDA terminal, in which a gun handle is usable in a state of being connected to a main body, and an operation control method therefor.

Discussion of the Background

A personal digital assistant (PDA) terminal or a personal information terminal refers to a computer that uses a touch screen as a main input device and is small and light enough to fit in one hand. That is, the PDA terminal is a device in which an address book function having personal schedule management, search, and management functions is added to a portable minicomputer that means a programmable computing device. The PDA terminal is configured to easily exchange data with a desktop and a notebook.

Unlike a general PDA terminal, an industrial PDA terminal is a product designed to be suitable for specific purpose by minimizing a damage risk caused by impact or the like and embedding a barcode scanner, a printer, or the like into a main body, taking into account that the PDA terminal is used at an industrial site. In particular, durability and robustness allowing the industrial PDA terminal to endure labor-intensive and rough field work may also be essential requirements of the industrial PDA terminal.

Since the industrial PDA terminal targets enterprise users rather than consumers, the industrial PDA terminal is also called an enterprise data assistant (EDA), and some enterprises call the industrial PDA terminal as a mobile computer device (MCD). A general PDA terminal gradually disappears as a smartphone having a function of a mobile phone becomes popular, but an industrial PDA terminal specialized in repetitive work is still popular in a real site.

The industrial PDA terminal has various types such as a hand-held type, a wearable type, and a vehicle type. In the case of a product that does not support wireless communication, a batch terminal that collects data and transmits the collected data when returned to a headquarter or a branch has made up the main part of products at the early stage. However, recently, most terminals have supported real-time data transmission and reception by using a WLAN function, a LAN function, a PAN function, and a VOIP function.

The industrial PDA terminal provides a barcode scanner function of capturing and recognizing a barcode, a quick response (QR) code, or the like, and other functions required in an industrial site. In the case of the industrial PDA terminal, it may be inconvenient to operate the barcode scanner function or other functions required for specific purpose only by using a keypad disposed in a PDA terminal.

In addition, a type of the keypad disposed in the PDA terminal may need to change according to a usage environment or purpose.

Therefore, there is a need to consider a method capable of more easily controlling an operation of a PDA terminal by coupling new accessories to a main body of the PDA terminal or replacing a keypad.

SUMMARY

An aspect of the present invention is directed to provide to a PDA terminal, in which a gun handle is usable in a state of being connected to a main body or a keypad is replaceable, and an operation control method therefor.

According to an embodiment of the present invention, a PDA terminal includes: a main body; a processor disposed in the main body; a memory accessible by the processor; and a display unit disposed on a front surface of the main body to display information processed by the processor, wherein a rear cover detachable from the main body is disposed on a rear surface of the main body, such that, after the rear cover is removed, a gun handle is usable in a state of being connected to a coupling part formed under the rear cover.

A switch may be disposed in the gun handle. When the gun handle is connected, the processor may perform control such that a preset operation is performed according to an operation of the switch.

According to another embodiment of the present invention, a method for controlling an operation of a PDA terminal, which includes a main body, a processor disposed in the main body, a memory accessible by the processor, and a display unit disposed on a front surface of the main body to display information processed by the processor, includes: removing a rear cover disposed on a rear surface of the main body and coupling a gun handle to a coupling part formed under the rear cover; operating a switch disposed in the gun handle; and performing, by the processor, a preset operation in response to an operation of the switch.

According to another embodiment of the present invention, a PDA terminal includes: a processor, a memory accessible by the processor, a display unit disposed on a front surface of the main body to display information processed by the processor, and a power source unit configured to supply operation power to the processor and the memory, wherein, when the auxiliary battery is initially connected in a state in which a main power supply is absent, the power source unit cuts off power supplied from an auxiliary battery, when the main power supply is connected after the auxiliary battery is connected, the power source unit generates the operation power by using power supplied from the main power supply in a state of cutting off the power supplied from the auxiliary battery, and when the main power supply unit is disconnected, the power source unit generates the operation power by using the power supplied from the auxiliary battery.

According to another aspect of the present invention, a method for controlling an operation of a PDA terminal includes: when the auxiliary battery is initially connected in a state in which a main power supply is absent, cutting off power supplied from an auxiliary battery; when the main power supply is connected after the auxiliary battery is connected, generating the operation power by using power supplied from the main power supply in a state of cutting off the power supplied from the auxiliary battery; and when the main power supply unit is disconnected, generating the operation power by using the power supplied from the auxiliary battery.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE ILLUSTRATED EMBODIMENTS

Hereinafter, the present invention will be described in detail with reference to the accompanying drawings.

Figure 1:
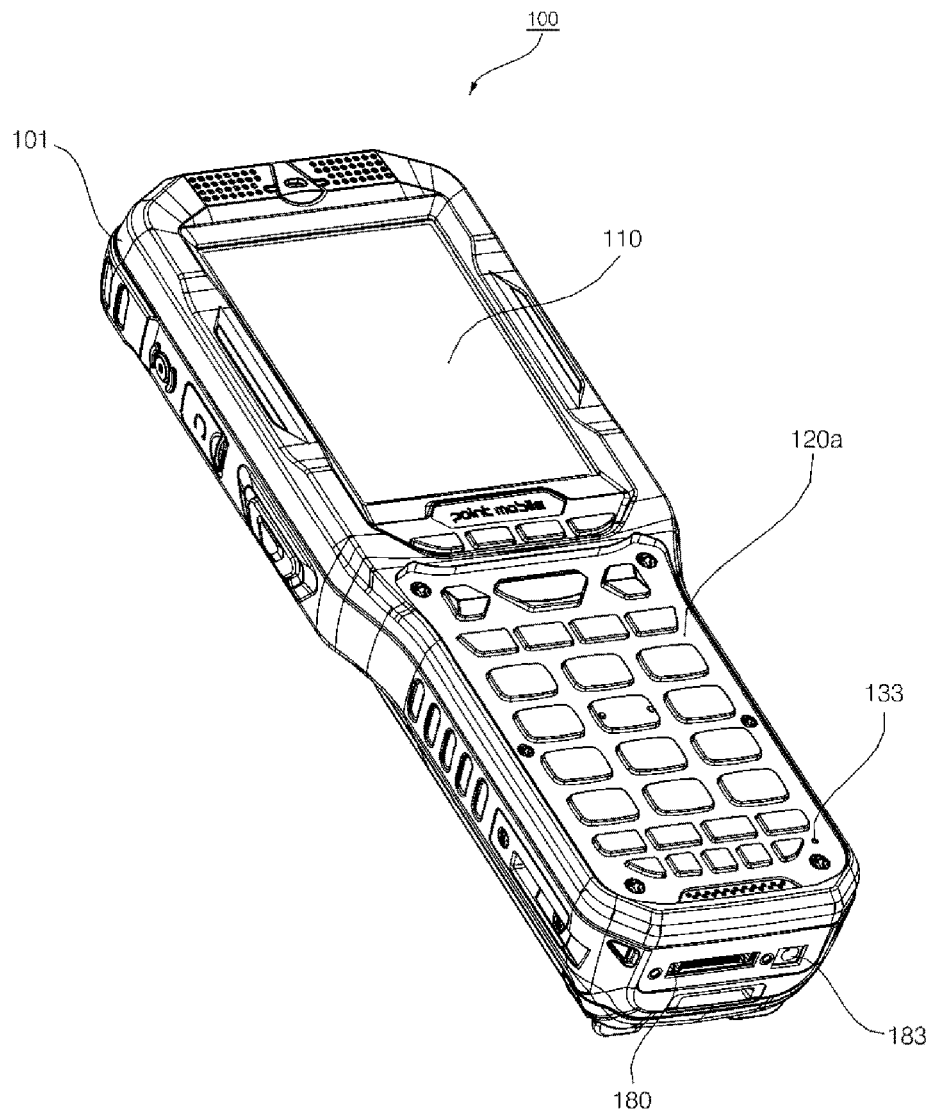
FIGS. 1 to 3 are views illustrating an appearance of a PDA terminal according to an embodiment of the present invention.
Figure 2:
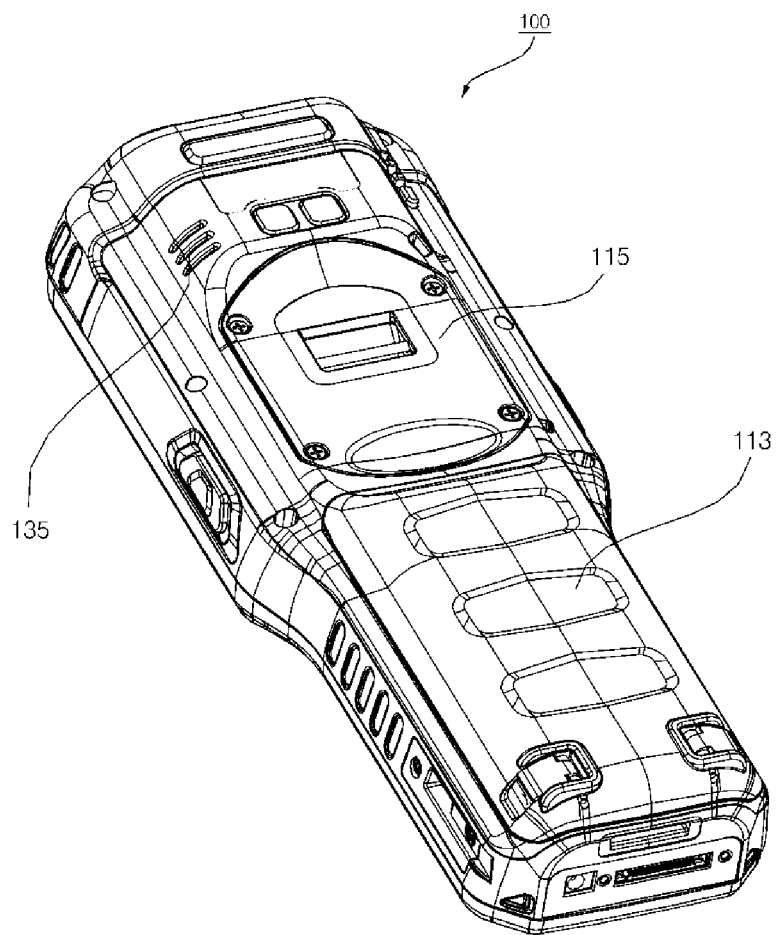
Figure 3:
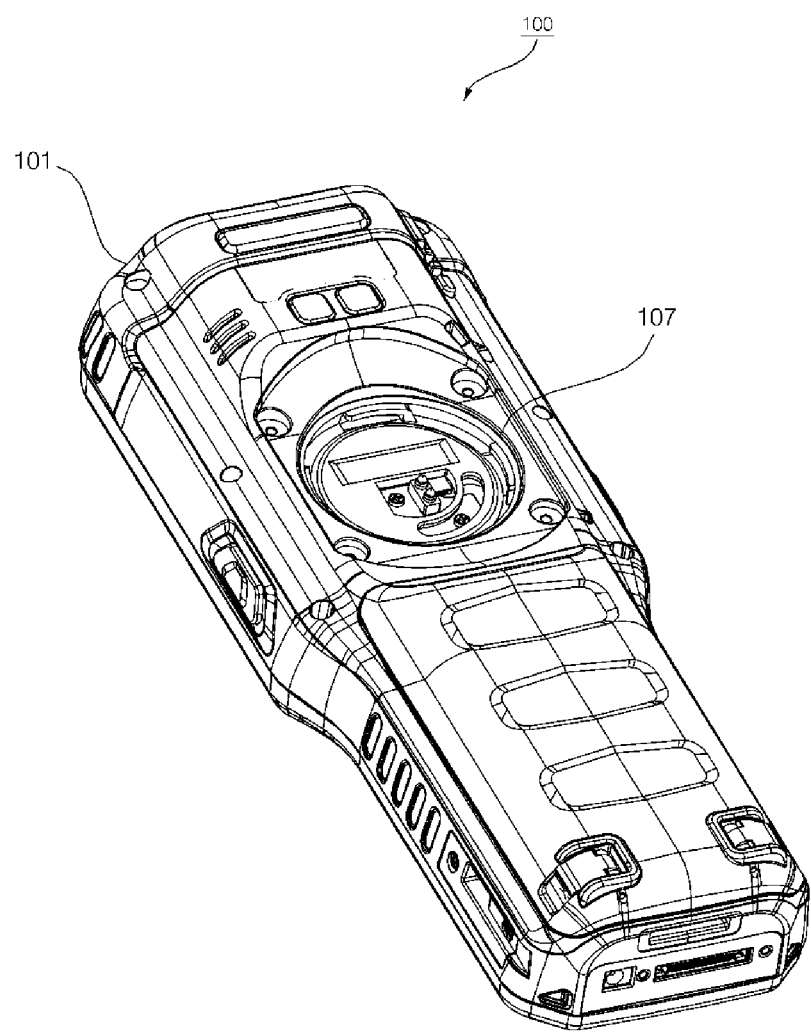

FIGS. 1 to 3 are views illustrating an appearance of a PDA terminal 100 according to an embodiment of the present invention.

Referring to FIGS. 1 to 3, various electronic components may be embedded in a space formed in a main body 101 of the PDA terminal 100. A display unit 110, a keypad 120a, and a microphone 133 may be disposed on a front surface of the main body 101. An interface unit 180 and an external power input terminal 183 may be disposed on a bottom surface of the main body 101.

The display unit 110 may display a menu or information processed by the PDA terminal 100. In the display unit 110, a touch pad is overlapped in a layered structure. Thus, the display unit 110 may be configured to operate as a touch screen and allow a user to input information though a touch of the user.

The keypad 120a, which is disposed on the front surface of the main body 101 and used as a user input unit, may be configured to allow the user to input a command or information though a push operation of the user.

The microphone 133 may receive a voice of the user or other sounds and convert the received voice or the received other sounds into an electrical signal. The microphone 133 may be appropriately realized such that voices of the user or other sounds are received.

The interface unit 180 serves as an interface with an external device connected to the PDA terminal 100.

External power for supplying operation power or charging an internal battery may be supplied to the external power input terminal 183.

A speaker 135 may be disposed on a rear surface of the main body 101 of the PDA terminal 100 and output audio data. In addition, after a battery cover 113 disposed on the rear surface of the main body 101 is opened, a battery may be detachably connected.

As illustrated in FIG. 3, after a rear cover 115 is opened, a gun handle described later may be connected to a coupling part 107 formed under the rear cover 115.

Figure 4:
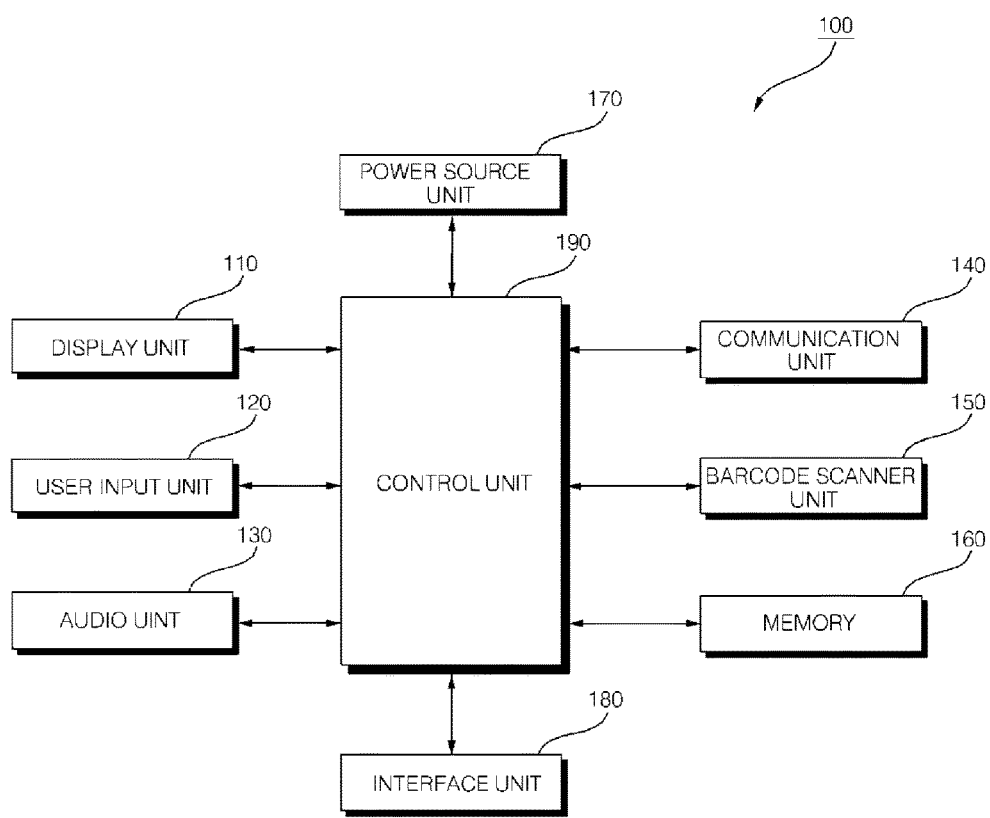
FIG. 4 is a block diagram of a PDA terminal according to an embodiment of the present invention.

FIG. 4 is a block diagram of the PDA terminal 100 according to an embodiment of the present invention.

Referring to FIG. 4, the PDA terminal 100 may include a display unit 110, a user input unit 120, an audio unit 130, a communication unit 140, a barcode scanner unit 150, a memory 160, a power source unit 170, the interface unit 180, and a control unit 190.

When these components are realized in an actual application, two or more components may be integrated into one component, or one component may be sub-divided into two or more components, if necessary.

The display unit 110 may display a menu or information related to operation processing of the PDA terminal 100.

The user input unit 120 may be configured to allow a user to input a user command for controlling the operation of the PDA terminal 100 through a push operation or a touch operation of the user. The user input unit 120 may be realized by a keypad, a dome switch, a touch pad, and the like.

The audio unit 130 may output sound data received though the communication unit 140 or stored in the memory 160. In addition, the audio unit 130 may receive an external sound signal through the microphone 133 and process the received sound signal into electrical voice data.

The communication unit 140 may transmit/receive a wireless signal to/from at least one of a base station, an external terminal, and a server on a mobile communication network. The communication unit 140 may include a module for wireless Internet access or short-range communication. In this case, Bluetooth, infrared communication, ultra wide band (UWB) communication, Wi-Fi, ZigBee, or the like may be used as short-range communication technology.

The barcode scanner unit 150 may provide a function of capturing and recognizing a barcode or a quick response (QR) code.

The memory 160 may store a program for processing and control of the control unit 190 and also store data received from a PDA terminal 100.

The memory 160 may store the program for processing and control of the control unit 190 and also perform a function of temporarily storing data input to or output from the PDA terminal 100.

The power source unit 170 receives main power or power of an auxiliary battery and supplies operation power required for an operation of each component. The main power may be power of a main battery or external power. In addition, the main battery or the auxiliary battery may be a rechargeable battery mounted on the PDA terminal 100.

The interface unit 180 serves as an interface with an external device connected to the PDA terminal 100. The interface unit 180 may receive data or power from the external device and transfer the received data or power to each component of the PDA terminal 100. The interface unit 180 may allow internal data of the PDA terminal 100 to be transmitted to the external device.

The control unit 190 controls operations of the above-described units to control an overall operation of the PDA terminal 100. The control unit 190 may include one or more processors.

Figure 5:
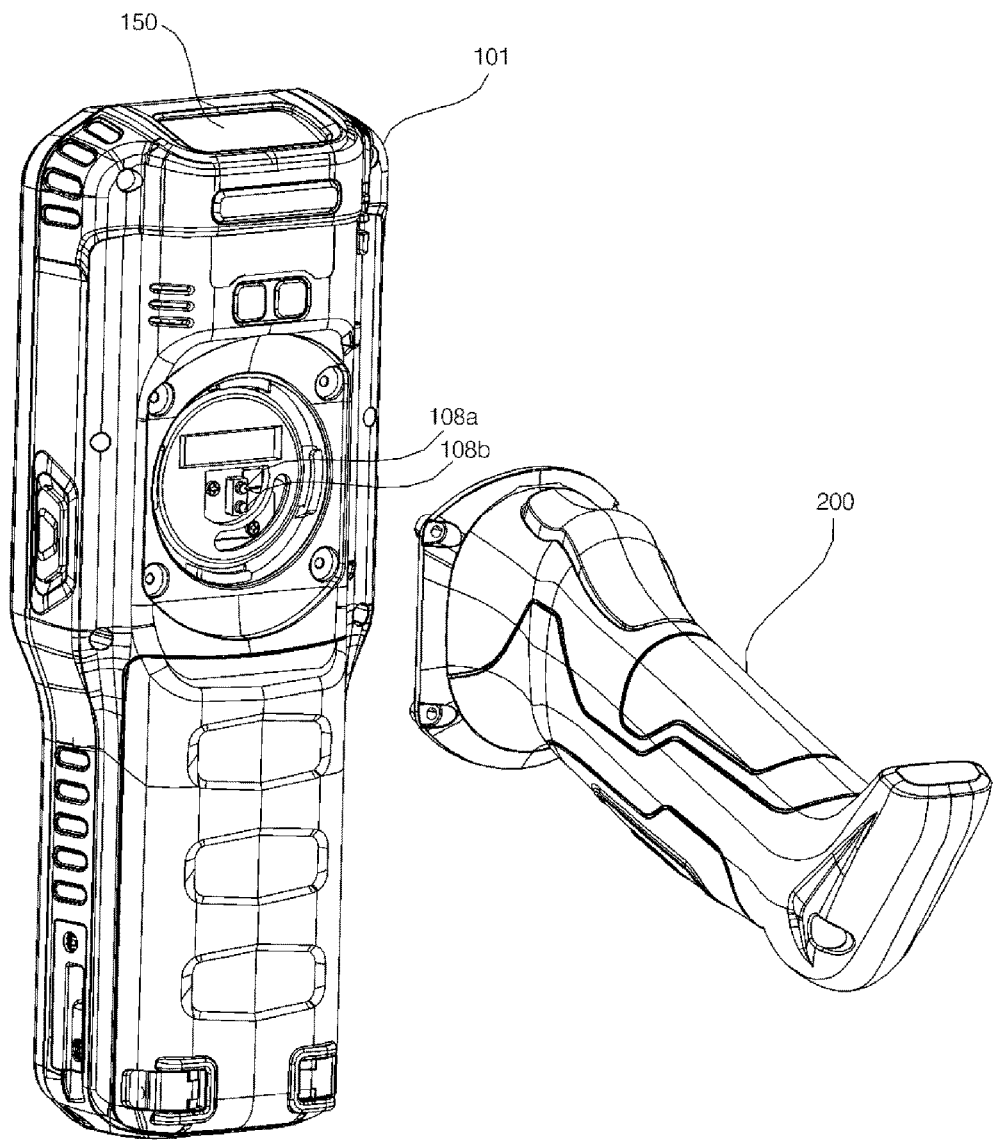
FIG. 5 is a view illustrating a main body and a gun handle.
Figure 6:
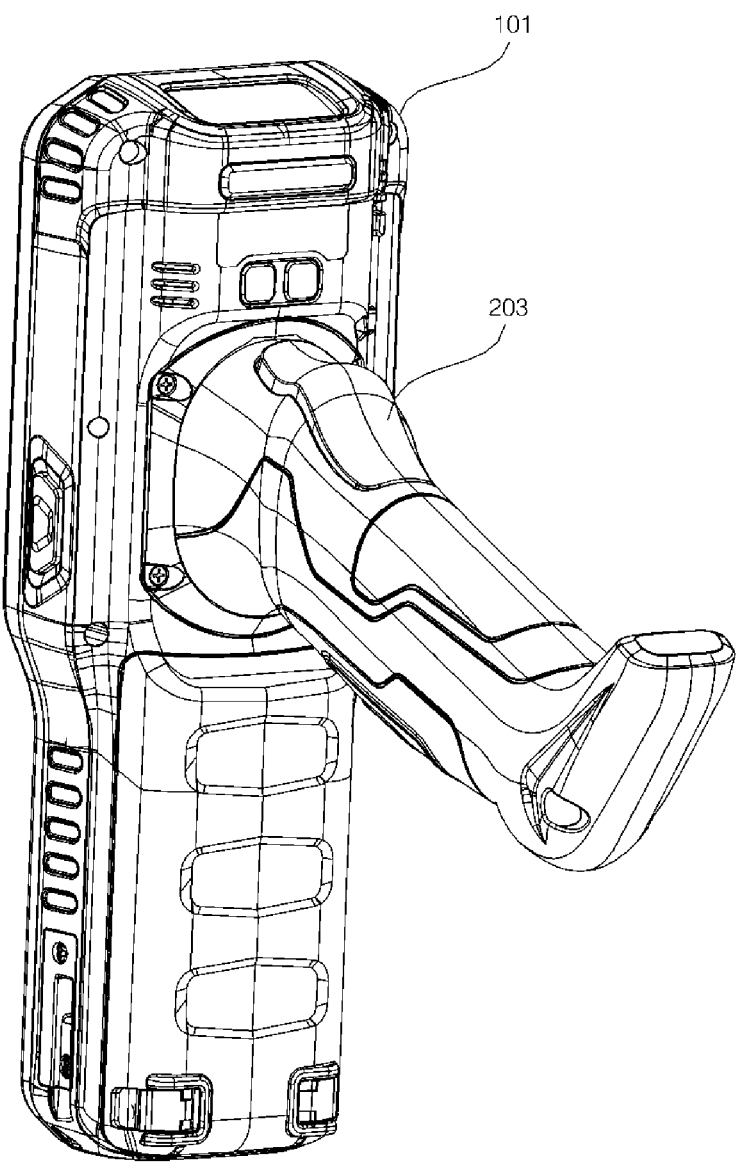
FIG. 6 is a view illustrating a state in which a gun handle is connected to a main body.

FIG. 5 is a view illustrating the main body 101 and a gun handle 200 in the PDA terminal 100 according to an embodiment of the present invention, and FIG. 6 is a view illustrating a state in which the gun handle 200 is connected to the main body 101.

As illustrated in FIGS. 5 and 6, the barcode scanner unit 150 may be disposed on an upper surface of the PDA terminal 100 to provide a function of capturing and recognizing a barcode or a QR code. After the rear cover 115 disposed on the rear surface of the main body 101 is opened, the gun handle 200 may be mounted.

The gun handle 200 may be connected to the main body 101 by rotating the gun handle 200 while an upper portion of the gun handle 200 is brought into close contact with the coupling part 107 of the main body 101 and then pushed.

After the gun handle 200 is connected, the gun handle 200 may be fixed to the main body 101 by using a fastening member such as a screw.

One or more switches 203 may be disposed in the gun handle 200. When the gun handle 200 is connected to the main body 101, the control unit 190 may grasp the type and the number of the switches 203 disposed in the gun handle 200 according to gun handle identification information transferred from the gun handle 200 though connection terminals 108a and 108b. Accordingly, the control unit 190 may operate a related menu or function and perform control such that a preset operation is performed according to on/off operations of the switches 203. For example, the switches 203 disposed in the gun handle 200 may be used for emitting a scanner beam from the barcode scanner unit 150.

The gun handle 200 may include a separate circuit or memory so as to provide the gun handle identification information to the control unit 190. In addition, when the gun handle 200 is connected to the main body 101, the control unit 190 may provide a menu for setting functions of the switches 203 disposed in the gun handle 200. A user may use the menu to set the functions of the switches 203 disposed in the gun handle 200 and set whether to operate the switches 203.

Figure 7:
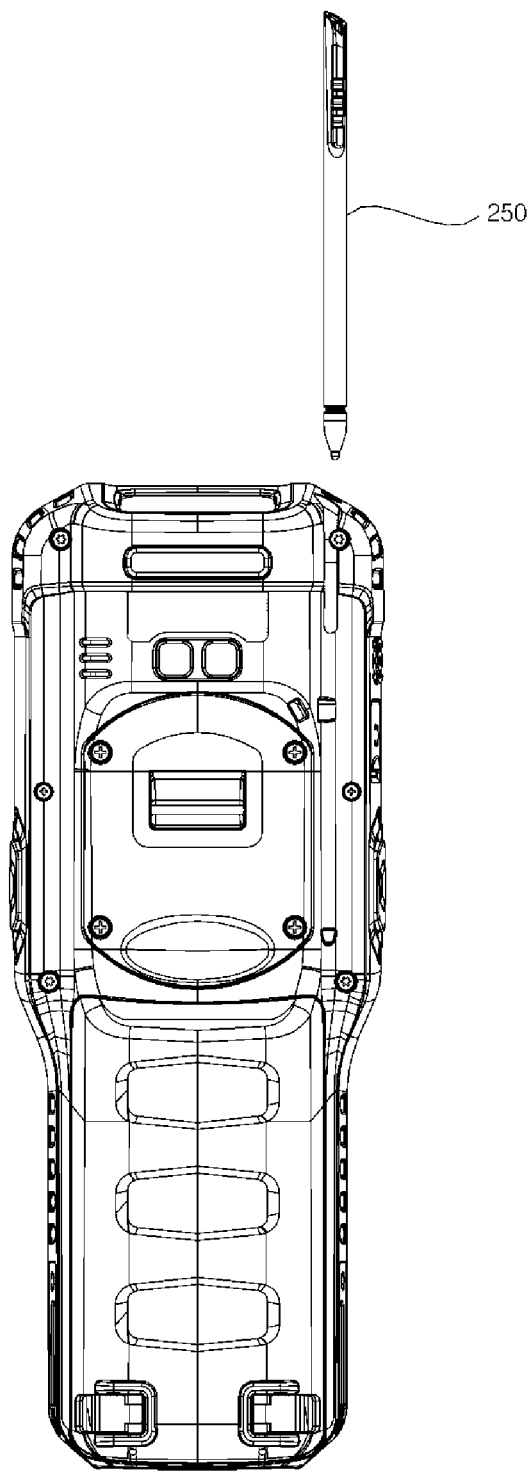
FIG. 7 is a view illustrating a state in which a stylus pen is separated from a main body.

FIG. 7 is a view illustrating a state in which a stylus pen 250 is separated from the main body 101.

As illustrated in FIG. 7, the PDA terminal 100 may include the stylus pen 250. The stylus pen 250 may be stored in a state of being inserted into a certain region of the main body 101 of the PDA terminal 100. Handwriting, drawing, or the like may be input on the display unit 110 by using the stylus pen 250.

Figure 8:
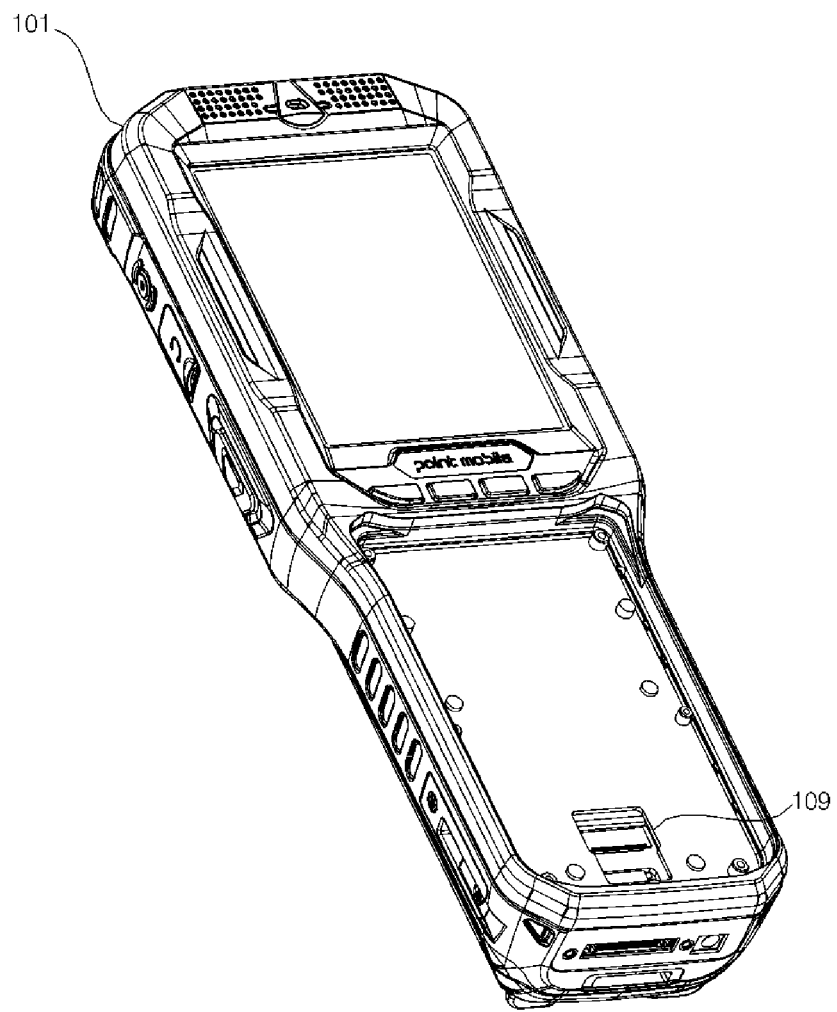
FIG. 8 is a view illustrating a state in which a keypad is removed from a main body.

FIG. 8 is a view illustrating a state in which a keypad is removed from the main body 101. As illustrated in FIG. 8, the keypad may be disposed on the front surface of the main body 101 and may be used as the user input unit 120. The keypad may be separated from the main body 101 so as to mount a different type of a keypad. The keypad may be electrically connected to electronic components disposed in the main body 101 through a connection terminal installed in a keypad connection part 109.

Figure 9:
FIG. 9 is a view illustrating a state in which a different type of a keypad is connected to a main body.

FIG. 9 is a view illustrating a state in which a different type of a keypad 120b is mounted on the main body 101.

As illustrated in FIG. 9, after an originally mounted keypad is separated from the main body 101, the different type of the keypad 120b may be mounted on the main body 101. For example, any one of various types of keypads such as a 34-key numeric/shifted alpha keypad, a 51-key full alpha/shifted numeric keypad, and a 57-key full alpha & numeric keypad may be used.

When a keypad is replaced, the control unit 190 may grasp a type of a currently connected keypad based on keypad identification information transferred from the keypad through the connection part 109. The control unit 190 may execute a related menu or function according to the type of the currently connected keypad.

As described above, a type of a keypad desired by a user may be mounted on the main body 101 according to a usage environment or purpose.

On the other hand, due to characteristics of an industrial PDA terminal that has to perform data capturing and wireless transmission/reception without stopping, the biggest consideration is a battery life. This is because, although the industrial PDA terminal has a lot of functions and excellent functions, it is impossible to perform work if the battery life is short. Therefore, power control is important in a PDA terminal. To this end, there is a need for a method for stably providing operation power by using main power or power of an auxiliary battery.

Figure 10:
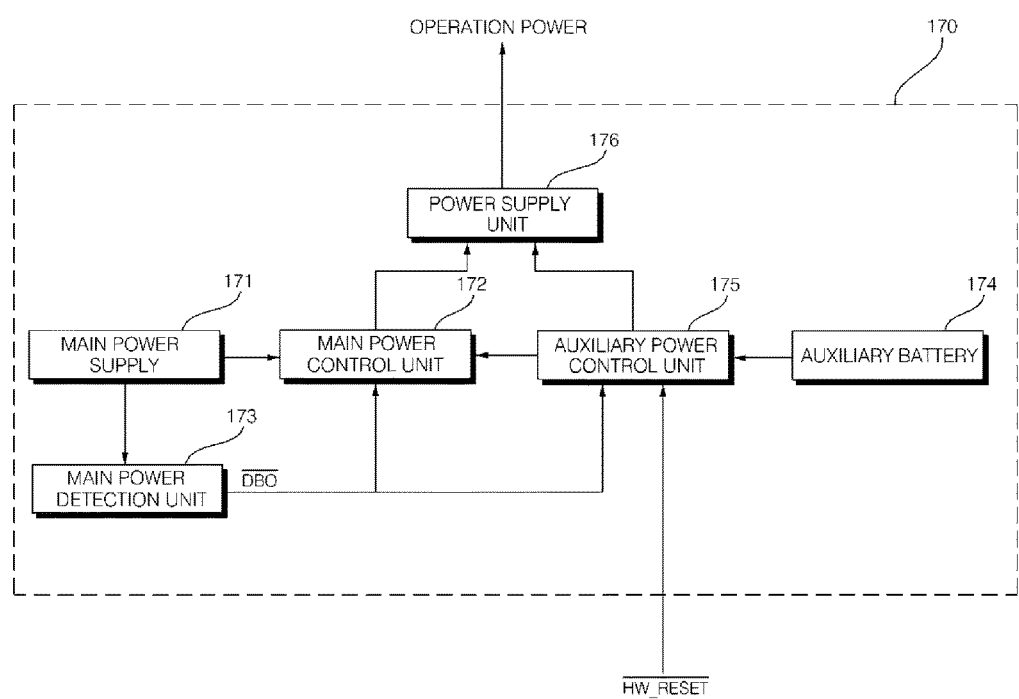
FIG. 10 is a block diagram of a power supply of FIG. 4.

FIG. 10 is a block diagram of the power source unit 170 of FIG. 4.

Referring to FIG. 10, the power source unit 170 may include a main power supply 171, a main power control unit 172, a main power detection unit 173, an auxiliary battery 174, an auxiliary power control unit 175, and a power supply unit 176.

The main power supply 171 may supply power of a main battery or external power to the power supply unit 176 under control of the main power control unit 172. The main power control unit 172 controls the supply of the power of the main power supply 171.

The main power detection unit 173 detects a state of the main power supply 171 and outputs a main power check signal /DBO. When the main power supply 171 is connected but a voltage level of the main power supply 171 is less than a reference value, the main power check signal /DBO having a low level is output. When the main power supply 171 is connected and the voltage level of the main power supply 171 is greater than or equal to the reference value, the main power check signal /DBO is maintained at a high level.

When the main power supply 171 is not initially connected, an /HW_RESET signal having a low level is output. When the main power supply 171 is connected, the /HW_RESET signal having a high level is output.

When the main power supply 171 is not usable, the auxiliary battery 174 supplies power to the power supply unit 176 under control of the auxiliary power control unit 175.

The auxiliary power control unit 175 controls the supply of the power of the auxiliary battery 174.

The power supply unit 176 generates operation power required for the operation of the PDA terminal 100 by using the power of the main power supply 171 or the auxiliary battery 174.

Due to such a configuration, in a case where the main power supply 171 is initially absent, although the auxiliary battery 174 is connected, the power source unit 170 uses the /HW_RESET signal having a low level to prevent the auxiliary power control unit 175 from supplying power to the power supply unit 176. This operation of the power source unit 170 aims to prevent an abnormal operation before the connection of the main power supply 171 and prevent unnecessary use of the auxiliary battery 174.

In addition, in a case where the auxiliary battery 174 is connected and then the main power supply 171 is connected, the power source unit 170 uses the main power check signal /DBO to prevent the auxiliary battery 174 from supplying power to the power supply unit 176. However, after the main power supply 171 is connected, when the main power supply 171 is removed, the power source unit 170 allows the auxiliary battery 174 to supply power to the power supply unit 176.

This operation of the power source unit 170 aims to prevent unnecessary use of the auxiliary battery 174 when the main power supply 171 is connected, prevent an abnormal operation caused by the main power supply 171 when the main power supply 171 is not able to supply a normal voltage, and perform an operation such as user data storage by using the power of the auxiliary battery 174.

The supply of the power of the auxiliary battery 174 may be cut off by using the /HW_RESET signal output from a combination key detection circuit. This operation may be performed for factory reset, but may be performed so as to store equipment for a long time when a user does not perform user data storage.

Figure 11:
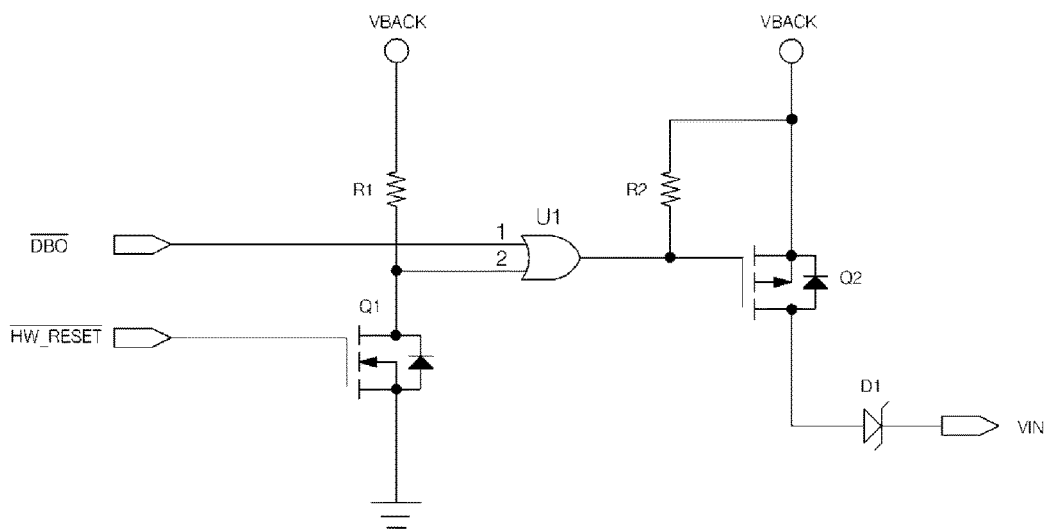
FIG. 11 is a view illustrating an example of a circuit configuration of an auxiliary power control unit.

FIG. 11 is a view illustrating an example of a circuit configuration of the auxiliary power control unit 175.

Referring to FIG. 11, the auxiliary power control unit 175 includes a resistor R1, a resistor R2, a MOSFET Q1, a MOSFET Q2, an OR gate U1, and a Schottky diode D1.

The resistor R1 has one end to which an output terminal VBACK of the auxiliary battery 174 is connected and the other end to which a second input terminal of the OR gate U1 is connected. The resistor R2 is connected between the output terminal VBACK of the auxiliary battery 174 and a gate of the MOSFET Q2.

The main power check signal /DBO is input to a first input terminal of the OR gate U1.

The MOSFET Q1 has a drain to which the other end of the resistor R1 is connected, a source connected to a ground terminal, and a gate to which the /HW_RESET signal is input.

The MOSFET Q2 has a gate to which an output terminal of the OR gate U1 is connected and a source to which the output terminal VBACK of the auxiliary battery 174 is connected.

The Schottky diode D1 has an anode to which a drain of the MOSFET Q2 is connected and a cathode to which an output terminal VIN of the auxiliary power control unit 175 is connected.

In such a configuration, since the /HW_RESET signal is at a low level before the main power supply 171 is connected, the MOSFET Q1 becomes an off state. Although the auxiliary battery 174 is connected and a voltage is applied to the output terminal VBACK of the auxiliary battery 174, when the /HW_RESET signal is at a low level, the MOSFET Q2 becomes an off state. Accordingly, a voltage of the output terminal VBACK of the auxiliary battery 174 is not transferred to the output terminal VIN of the auxiliary power control unit 175.

When the main power supply 171 is connected and a voltage level of the main power supply 171 is greater than or equal to a reference value, the main power check signal /DBO becomes a high level and the output of the OR gate U1 becomes a high level. Thus the MOSFET Q2 becomes an off state. Accordingly, the voltage of the output terminal VBACK of the auxiliary battery 174 is not transferred to the output terminal VIN of the auxiliary power control unit 175.

However, when the main power supply 171 is removed or the voltage level of the main power supply 171 is less than the reference value, the main power check signal /DBO becomes a low level, and the /HW_RESET signal becomes a high level after the power of the main power supply 171 is supplied. Since the MOSFET Q1 becomes an on state and the output of the OR gate becomes a low level, the MOSFET Q2 becomes an on state. Accordingly, the voltage of the output terminal VBACK of the auxiliary battery 174 is transferred to the output terminal VIN of the auxiliary power control unit 175.

In addition, although the main power supply 171 is removed and the main power check signal /DBO becomes a low level, the MOSFET Q1 becomes an off state even when the /HW_RESET signal becomes a low level due to a specific key combination. Thus, the output of the OR gate U2 becomes a high level and the MOSFET Q2 becomes an off state. Accordingly, the voltage of the output terminal VBACK of the auxiliary battery 174 is not transferred to the output terminal VIN of the auxiliary power control unit 175.

Figure 12:
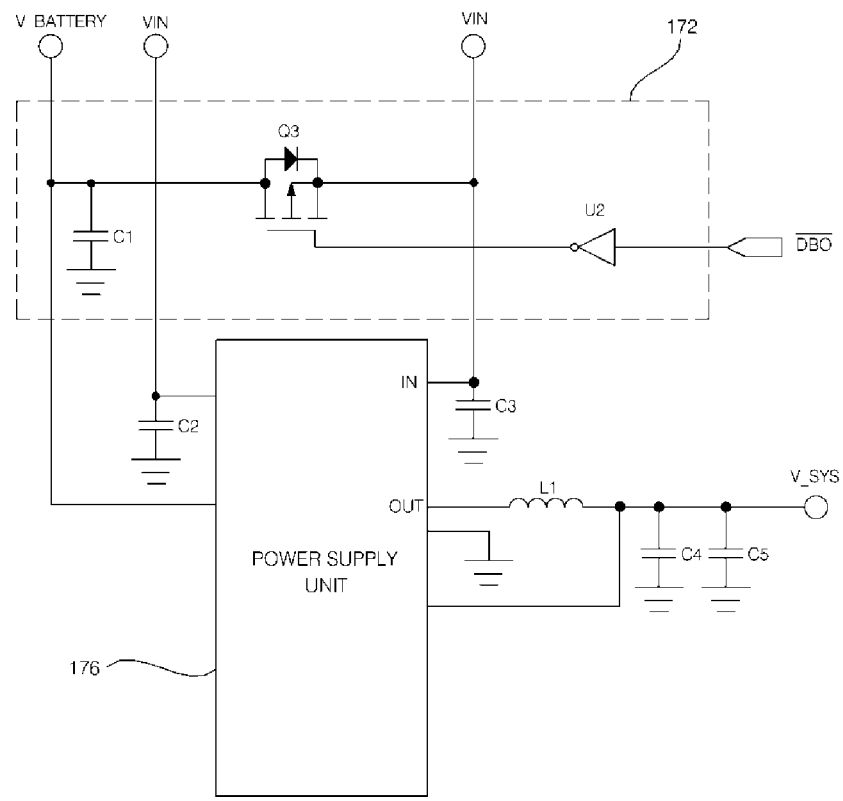
FIG. 12 is a view illustrating an example of a circuit configuration of a main power control unit.

FIG. 12 is a view illustrating an example of a circuit configuration of the main power control unit 172.

Referring to FIG. 12, the main power control unit 172 includes a MOSFET Q3 and an inverter U2.

The main power check signal /DBO is input to an input terminal of the inverter U2. When the main power supply 171 is connected and the voltage level is greater than or equal to the reference value, the main power check signal /DBO becomes a high level and an output of the inverter U2 becomes a low level. Therefore, the MOSFET Q3 becomes an on state, and a voltage of an output terminal V_BATTERY of the main power supply 171 is input to an input terminal IN of the power supply unit 176.

On the contrary, when the main power supply 171 is not connected or the voltage level of the main power supply 171 is less than the reference value, the main power check signal /DBO becomes a low level and the output of the inverter U2 becomes a high level. Since the MOSFET Q3 becomes an off state, the voltage of the output terminal V_BATTERY of the main power supply 171 is not transferred to the power supply unit 176, and a voltage of the output terminal VIN of the auxiliary power control unit 175 is applied to the input terminal IN of the power supply unit 176.

The power supply unit 176 generates operation power V_SYS by using the voltage of the main power supply 171 or the voltage of the auxiliary battery 174 input through the auxiliary power control unit 175. The power supply unit 176 may generate operation power having various voltage levels.

Due to such a configuration, operation power may be stably generated by using the main power or the power of the auxiliary battery.

According to the present invention, a gun handle may be usable in a state of being connected to a main body of a PDA terminal, and a switch may be disposed in the gun handle, thereby controlling an operation of the PDA terminal more conveniently in an industrial site or the like. In addition, different types of keypads may be replaced according to a usage environment or purpose, thereby improving operational convenience of the PDA terminal. Furthermore, when an auxiliary battery is connected in a state in which a main power supply is not connected, an abnormal operation may be prevented by preventing power generation. When the main power supply is connected, operation power may be generated by using power of the main power supply, and when the main power supply is not connected, operation power may be generated by using power of the auxiliary battery. Therefore, the PDA terminal may be more stably operated by using the power of the main power supply or the auxiliary battery.

Although embodiments of the present invention have been described, it will be understood by those skilled in the art that the present invention should not be limited to the described embodiments. Rather, various changes and modifications can be made within the spirit and scope of the present invention, as defined by the following claims.

What is claimed is:

1. A PDA terminal comprising:
a main body;
a processor disposed in the main body;
a memory accessible by the processor;
a keypad disposed on one surface of the main body; and
a display unit disposed on a front surface of the main body
to display information processed by the processor, wherein a rear cover detachable from the main body is disposed on a rear surface of the main body, such that, after the rear cover is removed, a gun handle with a switch is used in a state of being connected to a coupling part formed under the rear cover, and the keypad is separated from the main body and is replaceable with a different type of a keypad, and when the gun handle is connected, the processor performs control such that a preset operation is performed according to an operation of the switch, wherein, when the keypad is replaced with the different type of the keypad, the processor executes a function or a menu corresponding to the different type of the keypad according to identification information transferred from the different type of the keypad.

2. The PDA terminal of claim 1, further comprising a barcode scanner unit configured to provide a function of capturing and recognizing a barcode or a quick response (QR) code, wherein the preset operation is to emit a scanner beam from the barcode scanner unit.

3. The PDA terminal of claim 1, wherein, when the gun handle is connected, the processor provides a menu for setting a function of the switch and setting whether to operate the switch.

4. The PDA terminal of claim 1, wherein the gun handle is connected to the main body by rotating the gun handle while an upper portion of the gun handle is brought into close contact with the coupling part and then pushed.

5. The PDA terminal of claim 1, further comprising a stylus pen stored in a state of being inserted into a certain region of the main body.

6. The PDA terminal of claim 1, further comprising a power source unit configured to supply operation power to the processor and the memory, wherein, when the auxiliary battery is initially connected in a state in which a main power supply is absent, the power source unit cuts off power supplied from an auxiliary battery, when the main power supply is connected after the auxiliary battery is connected, the power source unit generates the operation power by using power supplied from the main power supply in a state of cutting off the power supplied from the auxiliary battery, and when the main power supply unit is disconnected, the power source unit generates the operation power by using the power supplied from the auxiliary battery.

7. The PDA terminal of claim 6, wherein the power source unit comprises:

a main power control unit configured to supply the power supplied from the main power supply in a state of cutting off the power supplied from the auxiliary battery when the main power supply is connected after the auxiliary battery is connected;

an auxiliary power control unit configured to cut off the power supplied from the auxiliary battery when the auxiliary battery is initially connected in a state in which the main power supply is absent, and to supply the power supplied from the auxiliary battery when the main power supply is disconnected after the main power supply is connected;

a power supply unit configured to generate the operation power by using power supplied from any one of the main power control unit and the auxiliary power control unit; and a main power detection unit configured to output a main power check signal to the main power control unit and the auxiliary power control unit when the main power supply is connected to output a voltage level grater than or equal to a reference value.

8. The PDA terminal of claim 7, wherein the auxiliary power control unit comprises:

a first resistor having one end connected to an output terminal of the auxiliary battery;

an OR gate having a first input terminal to which the main power check signal is input and a second input terminal to which the other end of the first resistor is connected;

a first MOSFET having a drain to which the other end of the first resistor and a connection node of the second input terminal of the OR gate are connected, a source connected to a ground terminal, and a gate to which a combination key signal is input, wherein the combination key signal changes from a low level to a high level when the main power supply is connected, and changes to a low level when a specific combination key is input;

a second MOSFET having a gate to which an output terminal of the OR gate is connected and a source to which the output terminal of the auxiliary battery is connected;

a second resistor connected between the output terminal of the OR gate and the gate of the second MOSFET; and a Schottky diode having an anode connected to the drain of the second MOSFET and a cathode serving as an output terminal of the auxiliary power control unit.

9. The PDA terminal of claim 8, wherein the main power control unit comprises:

an inverter having an input terminal to which the main power check signal is input; and a third MOSFET having a gate to which an output terminal of the inverter is connected, a source to which an output terminal of the auxiliary power control unit is connected, and a drain to which an output terminal of the main power supply is connected, wherein the source of the third MOSFET and a connection node of the output terminal of the auxiliary power control unit are connected to an input terminal of the power supply unit.

10. A method for controlling an operation of a PDA terminal including a main body, a processor disposed in the main body, a memory accessible by the processor, a display unit disposed on a front surface of the main body to display information processed by the processor, and a keypad disposed on one surface of the main body, the method comprising:

removing a rear cover disposed on a rear surface of the main body and coupling a gun handle to a coupling part formed under the rear cover;

operating a switch disposed in the gun handle;

performing, by the processor, a preset operation in response to an operation of the switch; and when the keypad is separated from the main body and replaced with a different type of a keypad, executing a function or a menu corresponding to the different type of the keypad according to identification information transferred from the different type of the keypad.

11. The method of claim 10, wherein the preset operation is to emit a scanner beam for capturing and recognizing a barcode or quick response (QR) code.

* * * * *